United States Patent [19]

Elko et al.

[11] Patent Number: 4,965,775

[45] Date of Patent: Oct. 23, 1990

[54] IMAGE DERIVED DIRECTIONAL MICROPHONES

[75] Inventors: Gary W. Elko, Summit; Robert A. Kubli, Whitehouse, both of N.J.; Jeffrey P. McAteer, Fishers, Ind.; James E. West, Plainfield, N.J.

[73] Assignee: AT&T Bell Laboratories, Murray Hill, N.J.

[21] Appl. No.: 354,535

[22] Filed: May 19, 1989

[51] Int. Cl.[5] ............ G01S 3/86

[52] U.S. Cl. ............ 367/119; 367/135; 381/92

[58] Field of Search ............ 381/92, 94, 158; 367/135, 903, 119, 123, 151

[56] References Cited

U.S. PATENT DOCUMENTS

| | | | |
|---|---|---|---|
| 1,735,905 | 11/1929 | Martin et al. | 381/158 |
| 4,589,137 | 5/1986 | Miller | 381/92 X |
| 4,658,425 | 4/1987 | Julstrom | 381/81 |
| 4,675,906 | 6/1987 | Sessler et al. | 381/92 |
| 4,742,548 | 5/1988 | Sessler et al. | 381/92 |
| 4,802,227 | 1/1989 | Elko et al. | 367/123 |

OTHER PUBLICATIONS

"Second Order Gradient Unidirectional Microphones Utilizing an Electret Transducer", G. M. Sessler et al., J. Acoustical Society of America; vol. 58, No. 1, Jul. 1975, pp. 273–278.

*Primary Examiner*—Thomas H. Tarcza
*Assistant Examiner*—Tod Swann
*Attorney, Agent, or Firm*—Geoffrey Green

[57] ABSTRACT

Second-order gradient (SOG) toroidal and unidirectional microphones derived using a first-order gradient sensor (FOG) and a reflecting plane are described. The FOG is positioned with its axis illustratively orthogonal to and suspended a few centimeters from a large acoustically reflecting surface. The resulting sensor image is phase reversed resulting in a transducer that is a linear quadrupole. The linear quadrupole can be described by two dimensions, the distance corresponding to the FOG's dipole distance and twice the distance from the reflecting plane. If the reflecting surface is large enough or if the wall of an enclosure is used, the resulting microphone becomes a SOG unidirectional microphone. The perfect match between the sensor and its image from a good acoustic reflector results in an ideal SOG microphone with 3 dB beam width of ±33° and no grating lobes below about 3 kHz for a spacing from the reflecting plane of about 2.5 cm. A wall-mounted toroid can be formed by using two FOGs at right angles to each other and with the axis of each sensor at 45° to the reflecting surface and a spacing between transducers that is twice the height of the transducers from the reflecting plane. A table-mounted toroid can be realized by properly combining a filtered version of a suspended FOG and an omnidirectional sensor flush mounted to the reflecting table-top. Other arrays of image-derived directional sensors are applied to hands-free telephoning and other noise and reverberation-reducing arrangements.

19 Claims, 6 Drawing Sheets

IMAGE DERIVED DIRECTIONAL MICROPHONES

TECHNICAL FIELD

This invention relates to directional microphones and acoustic sensors.

BACKGROUND OF THE INVENTION

Acoustic transducers with directional characteristics are useful in many applications. In particular, unidirectional microphones with their relatively large directivity factors for their small size are widely used. Most of these microphones are of the first order gradient type which exhibit, depending on the construction details, directional characteristics described by $(a+\cos\theta)$, where a is a constant $(o \leqq a \leqq 1)$ and $\theta$ is the angle relative to the rotational axis of symmetry. Directivity factors ranging up to four can be obtained with such systems.

The directivity may be improved by utilizing second order gradient microphones. These microphones have a directional pattern given by $(a+\cos\theta)(b+\cos\theta)$ where $|a| \leqq |$ and $|b| \leqq 1$ and yield maximum directivity factors of nine. Wide utilization of such microphones was impeded by the more complicated design and the poor signal to noise ratio when compared with the first order designs.

One of the more recent versions of second order gradient microphones is disclosed in U.S. Pat. No. 4,742,548 issued May 3, 1988, for the invention of one of us, James E. West and Gerhard Martin Sessler. While this version represented an advance with respect to prior designs, the relative positioning and sensitivity of the two first-order directional elements employed therein can become overly demanding wherever two or more second-order gradient microphones are to be "matched" or used together, as in an array of such microphones.

Therefore, it is desirable to have an even simpler way to implement a second order gradient microphone and arrays thereof.

SUMMARY OF THE INVENTION

According to our invention, we have discovered that the solution to the problem of better unidirectional microphones and sensors is the use of a planar reflecting element in proximity to a directional microphone or other sensor element to simulate the presence of a second (paired) directional sensor element. Our technique is preferably used to yield second-order-gradient microphones with a variety of patterns including unidirectional and torodial directional characteristics.

According to a first feature of our invention, the lateral extent of the reflecting element and the position of the sensor relative to that surface should be sufficient to preclude any destructive interference from other reflecting surfaces.

According to a second feature of our invention, a first-order gradient bidirectional microphone or other sensor element is mounted at a selected separation from an acoustically-reflective wall to improve directional response of the assembly and to suppress the effect of reverberation and noise in the room.

According to yet another feature of our invention, image-derived directional microphones can be arrayed to alleviate the persistent problems of hands-free telephony, such as multipath distortion (from room reverberation), speech mutilation caused by gain switching and related problems. The directional properties of the array is the product of the gradient and line array properties.

Still other features of our invention relate to configurations of image-derived directional acoustic sensors to achieve unique directivity patterns, such as toroidal patterns, and to combinations with an omnidirectional acoustic sensor to modify a directivity pattern.

BRIEF DESCRIPTION OF THE DRAWINGS

Other features and advantages of our invention will become apparent from the following detailed description, taken together with the drawing, in which.

GENERAL DESCRIPTION

In the prior art, matching pairs of first-order gradient bidirectional sensor (FOGs) spaced by a small distance from each other and added with the proper phase and delay to form a second-order gradient (SOG) unidirectional microphone, as in the above-cited West et al patent, have demonstrated frequency-independent directional response, small size, and relatively simple design. These systems are mainly designed to operate either freely suspended above or placed on a table top. They also can have either toroidal or unidirectional polar characteristics. The polar characteristics of such microphones are dependent on the close matching of both amplitude and phase between sensors over the frequency range of interest.

In contrast, arrangements according to our invention provide a surprisingly simple solution to forming SOGs with both toroidal and other directional characteristics that can be mounted directly on an acoustically reflecting wall or on a large acoustically reflecting surface that can be placed on or near a wall. All of the features of previous second-order systems are preserved in the new system, with the advantages of an improvement in signal-to-noise ratio, (3 dB higher for these new sensors). It is noteworthy that only one sensor is required to achieve second-order gradient and other directional characteristics, and that the image is a perfect match to the real sensor both in frequency and phase. While the literature describes some limited effects of an omnidirectional or unidirectionl sensors placed near a reflecting surface (see U.S. Pat. No. 4,658,425), no suggestion has been made of our arrangement for, or the resulting advantages of our arrangement of, first order gradient sensors in association with reflectors.

DETAILED DESCRIPTION

Figure 1:
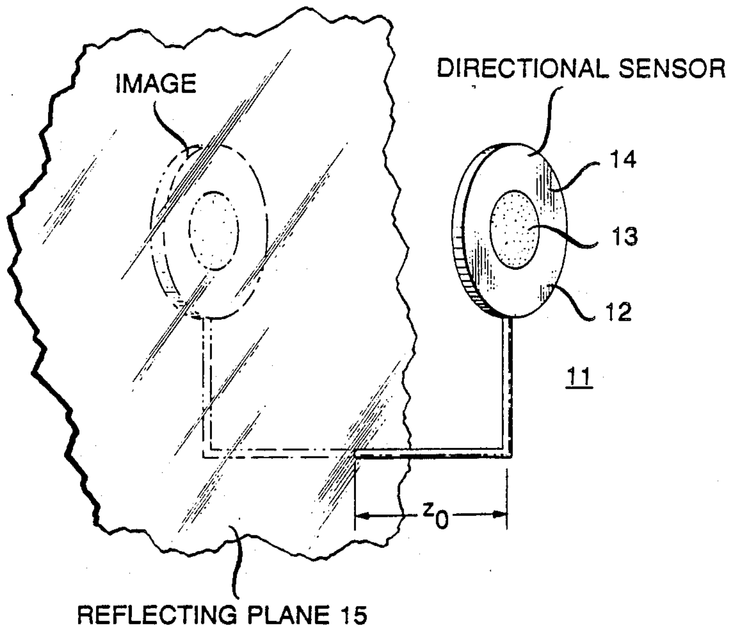
FIG. 1 shows a second-order gradient microphone composed of a baffled first-order gradient microphone over a reflecting plane.

The arrangement of FIG. 1 includes a directional microphone assembly 11, consisting of a single commercially available first-order gradient (FOG) sensor 13 (Panasonic model WM-55D103), which is cemented into an opening 14 at the center of a (for example, 3 cm diameter and 2.5 mm thick) baffle 12 as shown in FIG. 1. Care must be taken to insure a good seal between the sensor and baffle. The sensor and baffle are placed at a prescribed distance from an acoustically reflecting plane 15, the surface defined by the sensor and baffle being parallel thereto. The bidirectional axis of the sensor 13 is orthogonal to plane 15. The prescribed distance $z_o$ from reflecting plane 15 is a function of the highest frequency of interest and if we choose $z_o=2.5$ cm, the resulting upper frequency limit is 3.5 kHz. The effective distance $d_2$ between the two sides of the diaphragm comprising baffle 12 is determined by the baffle size and was experimentally set to 2 cm. From geometrical considerations, the output of the sensor is the addition of itself and its image. We will now show that the resulting sensor has second-order gradient characteristics.

Figure 2:
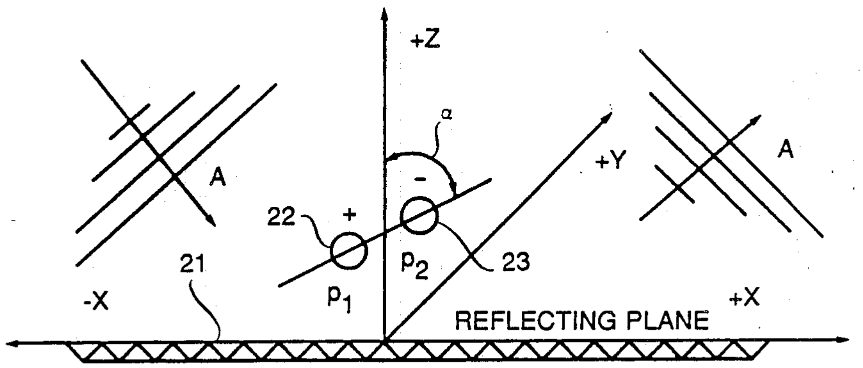
FIG. 2 is a schematic diagram of a first-order gradient sensor located over a reflecting plane.

FIG. 2 is a schematic model of a dipole sensor $P_1$, $P_2$, e.g., dipole elements 22, 23 of an eletret FOG sensor located over a reflecting plane 21 at a general angle $\alpha$. The analysis below will demonstrate that $\alpha$ is optimally equal to 0°. For an incident plane-wave of frequency $\omega$ we can decompose the field into the incident and reflected fields, $$p_i(t)=P_0e^{j(\omega t+k_xx+k_yy-k_zz)} \quad (1)$$

$$p_r(t)=P_0e^{j(\omega t+k_xx+k_yy+k_zz)}$$

where $k_x$, $k_y$, and $k_z$ are the components of the wave-vector field. The total pressure at any location is, $$p_T(t)=p_i(t)+p_r(t)=2P_0\cos(k_zz)e^{j(\omega t+k_xx+k_yy)}. \quad (2)$$

Equation 2 shows that the resulting field has a standing wave in the z-direction and propagating plane wave fields in the x and y-directions. In spherical coordinates $k_x$, $k_y$, and $k_z$ can be written as, $$k_x=k\cos\phi\sin\theta \quad (3)$$

$$k_y=k\sin\phi\sin\theta$$

$$k_z=k\cos\theta$$

where k is the acoustic wavenumber. Since the gradient sensor output is proportional to the spatial derivative of the acoustic pressure in the direction of the dipole axis, the output of the dipole sensor can be written as, $$p_d(\alpha, x, y, z, t) = \frac{\partial p_T(t)}{\partial x}\sin\alpha + \frac{\partial p_T(t)}{\partial z}\cos\alpha. \quad (4)$$

If we now assume that $k_zz<<\pi$ then, $$p_d(\alpha,x,y,z,t)\approx 2P_0ke^{j(\omega t+k_xx+k_yy)}[j\cos\phi\sin\theta\sin\alpha+kz\cos^2(\theta)\cos\alpha]. \quad (5)$$

If $\alpha=0$ then, $$|p_d(z)|\,\big|_{\alpha=0} \approx 2P_0zk^2\cos^2(\theta). \quad (6)$$

Equation 6 shows that if the gradient axis is placed normal to the reflecting surface then the directional response is $\cos^2(\theta)$, which is the directivity of a linear quadrupole, or second-order transducer. If $$\alpha = \frac{\pi}{2} \text{ then,}$$

$$|p_d(z)|\,\big|_{\alpha=\frac{\pi}{2}} \approx 2P_0k\cos\phi\sin\theta \quad (7)$$

which is the directional response for a first-order gradient. In general, if $k_zz<<\pi$, $$|p_d(\alpha,z)|\approx 2P_0k[\cos^2\phi\sin^2\theta\sin^2\alpha+(kz)^2\cos^4(\theta)\cos^2\alpha]^{\frac{1}{2}} \quad (8)$$

Therefore the axis of the dipole sensor 13 in FIG. 1 should be oriented perpendicular to the plane of the baffle 12 and perpendicular to reflecting plane 15.

Figure 10:
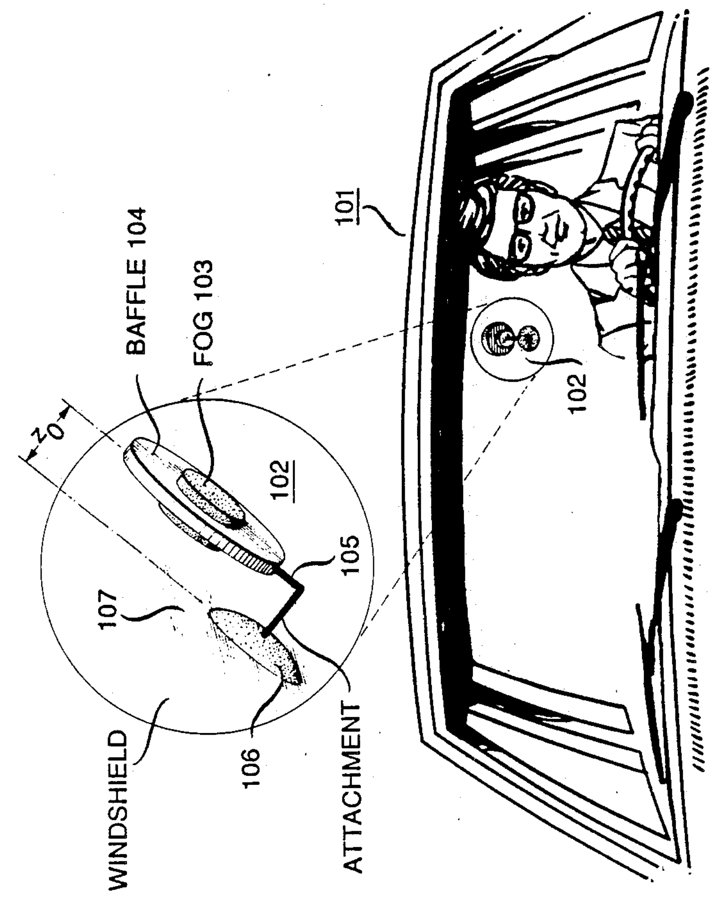
FIG. 10 is a pictorial illustration of the invention in mobile cellular telephony.

Specific applications of wall-mounted directional microphones are, for example, conference room applications and also hands-free telephony as in mobile cellular telephony shown in FIG. 10.

In the vehicle 101, the microphone assembly 102, of the type discussed with respect to FIGS. 1 and 2, is mounted on the inner surface of the windshield 107. The assembly 102 includes the first-order gradient sensor element 103 mounted within baffle 104, which is mounted with baffle plane parallel to windshield 107 but with the sensor bi-directional axis and its directivity pattern orthogonal to windshield 107 and the sensor spacing therefrom being $z_o$, as explained for FIG. 1. The spacing and orientation are maintained by a vibration-isolating mounting 105 and adhesive spot 106, through both of which the microphone lead wires can pass on their way to the mobile cellular radio unit (not shown).

WALL-MOUNTED TOROIDAL SYSTEM

Figure 3:
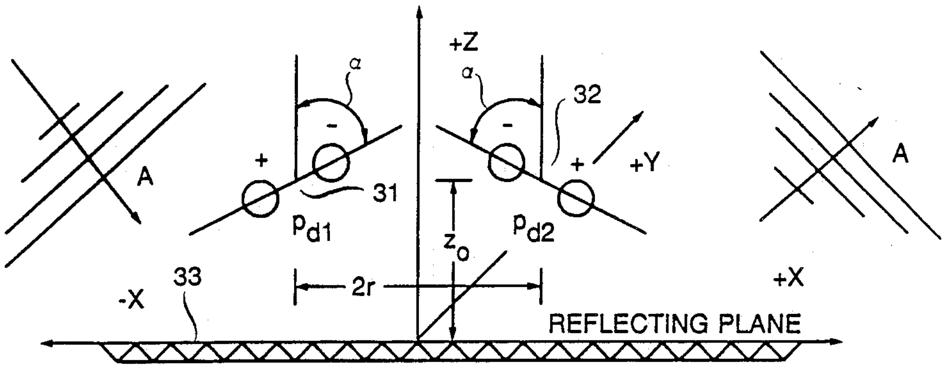
FIG. 3 is a schematic diagram of a wall-mounted toroidal sensor array.

A toroidal microphone for mounting on a wall can be designed which consists of two FOGs in baffles. FIG. (3) show a schematic representation of the transducer. From the above analysis we can write the output of sensors 31 and 32 as, $$p_{d1}(-\alpha,-r,z_0)=2P_0[-jk_x\cos(k_zz_0)\sin\alpha+k_z\sin(k_zz_0)\cos\alpha]^*[e^{j(\omega t+k_yy-k_xr)}] \quad (9)$$

$$p_{d2}(\alpha,r,z_0)=2P_0[jk_x\cos(k_zz_0)\sin\alpha+k_z\sin(k_zz_0)\cos\alpha]^*[e^{j(\omega t+k_xr+k_yy)}].$$

where $\alpha$, r, and $z_0$ are labeled in FIG. 3. The toroid is formed by simply adding the output of these two sensors, $$p_{toroid}=p_{d1}+p_{d2}\,|\,_{k_zz_0<<\pi \text{ and } k_xr<<\pi}. \quad (10)$$

(Note that we have dropped the functional dependencies for compactness.) If we assume that the spacings between the two sensors and the wall is small compared to a wavelength then, $$p_{toroid} \approx 4P_0k^2e^{j(\omega t+k_yy)}[r\cos^2\phi\sin^2\theta\sin\alpha+\cos^2\theta z_0\cos\alpha]. \quad (11)$$

If we now let r sin α = $z_0$ cos α = K, $$p_{toroid}=4P_0k^2Ke^{j(\omega t+k_yy)}[\cos^2\phi\sin^2\theta+\cos^2\theta]. \quad (12)$$

For $\phi=0$, or $\pi$, $$|p_{toroid}|=4P_0k^2K \quad (13)$$

and for $\phi=\frac{\pi}{2}$, $$|p_{toroid}|=4P_0k^2K\cos^2\theta. \quad (14)$$

If $r=z_0$, then $$\cos(\alpha)=\sin\alpha \Rightarrow \alpha=45° \quad (15)$$

or, in general, $$\tan(\alpha)=\frac{z_0}{r}. \quad (16)$$

The configuration that we have experimentally investigated uses a spacing between transducers that is equal to twice the height of the transducers from the reflecting plane. Therefore the dipoles are rotated at +, −45° relative to the surface normal. In this system we generate two images to be summed along with the two sensors. A nice intuitive way of looking at the resulting transducer is to consider the toroid as the sum of two perpendicular arrays composed of one sensor and the image of the opposing sensor. It can clearly be seen that this decomposition results in two linear quadrupole arrays that are perpendicular to one another. By symmetry, the cross-over point between the two linear quadrupoles must add in phase thereby completing the toroid. Continuing with this argument, the linear quadrupoles have a directivity that is $\cos^2\theta$ along their principle axis. Since the linear quadrupoles are perpendicular to one another we can reference the coordinate system along one on the linear quadrupoles principle axis. If we do this, we can see that the linear combination of the two microphones is, $\cos^2\theta+\sin^2\theta=1$. Along the axis normal to the linear quadrupoles the response remains $\cos^2\theta$. Therefore, the resulting transducer response is a second-order toroid.

Figure 4:
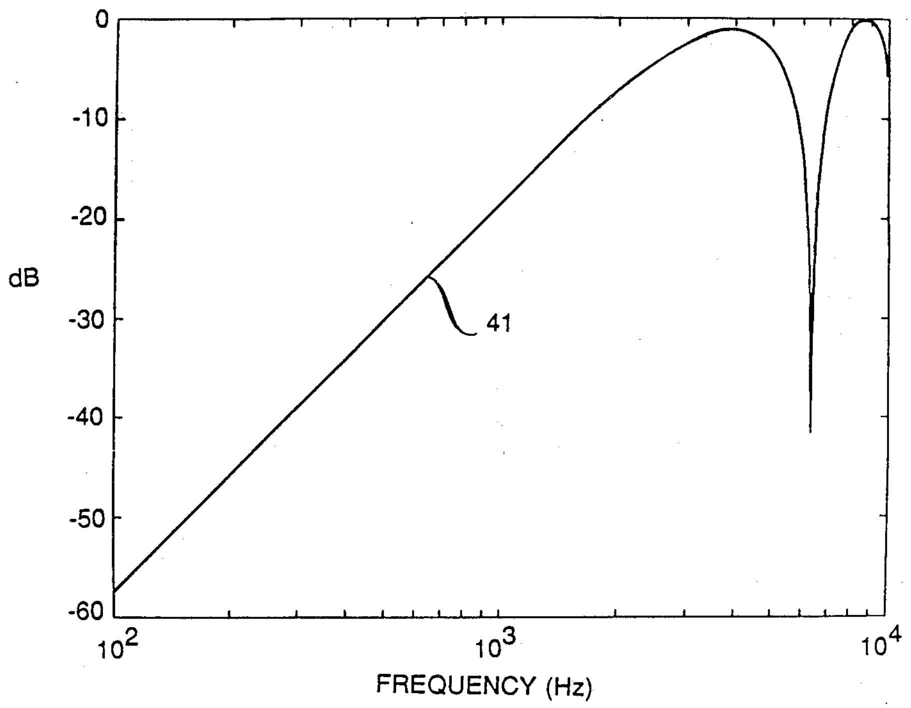
FIG. 4 is a theoretical frequency response for a wall-mounted toroidal for baffled gradients spaced apart and positioned above a reflecting plane.

The frequency response of the sum of all four sensors, two real and two images is a function of wave incident angle. FIG. 4 is a plot 41 of the theoretical frequency response for a wave incident in the z-direction for $r=z_0=2.5$ cm. The expected $\omega^2$ dependency can easily be seen.

Unlike previous toroidal microphones, this microphone array requires precise matching of only two gradient transducers.

We have so far described single microphones consisting of one or two FOG sensors to form second-order unidirectional and toroidal directional characteristics. It will be apparent to those skilled in the microphone art that linear or planar arrays may be formed using FOG sensors and that then arrays may be placed near an acoustically reflecting surface, thereby multiplying the directivity factor of the array because of the second-order gradient response of each sensor plus its image. The same argument can be made for a toroidal array or curved array that follows the contour of a non-planar reflecting surface.

It is further known to those skilled in the art that acoustic absorbing material and/or resonators in selected frequency bands may be incorporated in the reflecting plane, thereby modulating the directivity index of a single microphone array. For example, one might want $\cos^2\theta$ response at low frequences and $\cos\theta$ response at high frequencies. This would require selecting acoustically absorbing material on the reflecting plane that reflects at low frequencies and absorbs at high frequencies.

Figure 11:
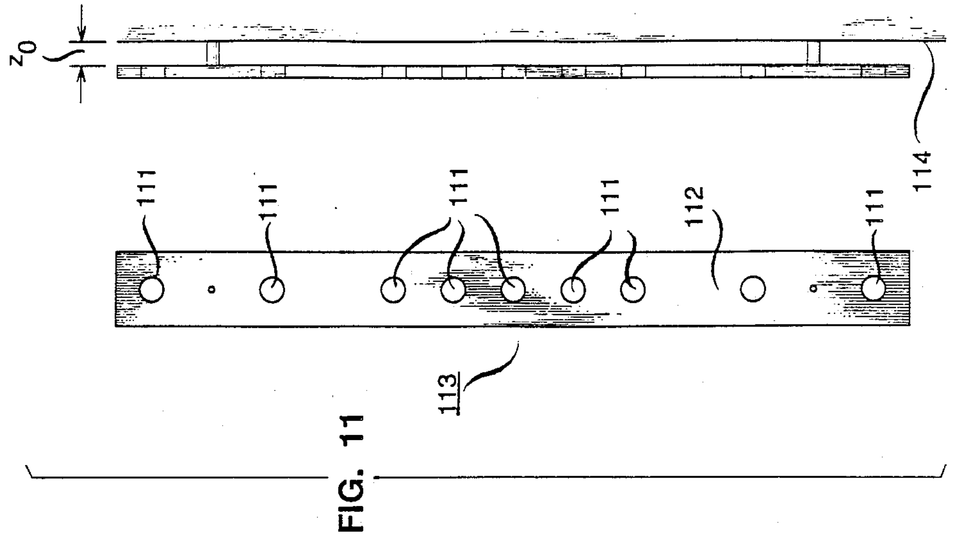
FIG. 11 shows a linear array employing the invention.

One typical line array for conference room telephony is shown in FIG. 11. Here, each first-order-gradient unit 111 is mounted, spaced and oriented to the acoustically reflecting wall as in FIG. 1 and FIG. 2, in the line array 112 as shown in two views, the left-hand one being full front and the right hand one being a side sectional view. The vertical orientation of line array 112 yields a pick-up pattern that is very narrow in the vertical direction.

TABLE-TOP TOROIDAL SYSTEM

Figure 5:
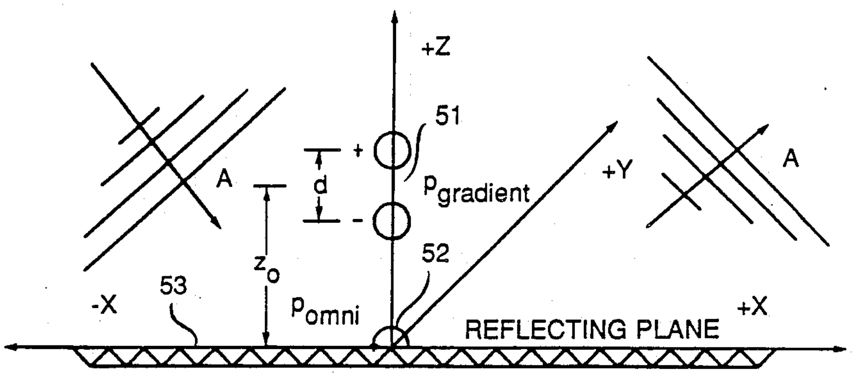
FIG. 5 is a schematic diagram of a table-top toroidal sensor array.

A table-top mounted toroidal system, where the receiving direction is in the plane of talkers' heads around the table, can be formed by properly combining the outputs of a flush-mounted omnidirectional sensor 52 with an effective second-order gradient sensor 51 of the type explained re FIG. 2 whose axis is perpendicular to the table-top, as is then its image. This configuration is shown in FIG. 5. Following the previous developments we can write for the combined sensor output, $$p_{combined}=p_{omni}+p_{gradient}*H(\omega) \quad (17)$$

where we have inserted the filter function H(ω) to compensate for the differences in the frequency response between the second-order gradient and the omindirectional sensor. If we set H(ω) as, $$H(\omega)=\frac{1}{k^2z_o}=\frac{c^2}{\omega^2z_0} \quad (18)$$

then, $$p_c=2P_0e^{j(\omega t+k_xx+k_yy)}\sin^2(\theta). \quad (19)$$

It can be seen in equation 19 that the resulting combination of the filtered gradient and the omnidirectional results in a toroid that is sensitive in the plane that is parallel to the table-top.

OPERATION

The following measurements were taken on the reflecting gradient microphone as a toroid and unidirectional sensor: directional characteristics, frequency response, and equivalent noise level.

We have used a spherical coordinate system where the angle $\phi$ is in the x−y plane (reflecting plane) and $\theta$ is the angle from the z-axis. The directional characteristics of the above arrangement of FOG and acoustically reflecting surface is given by equation 6.

Figure 6:
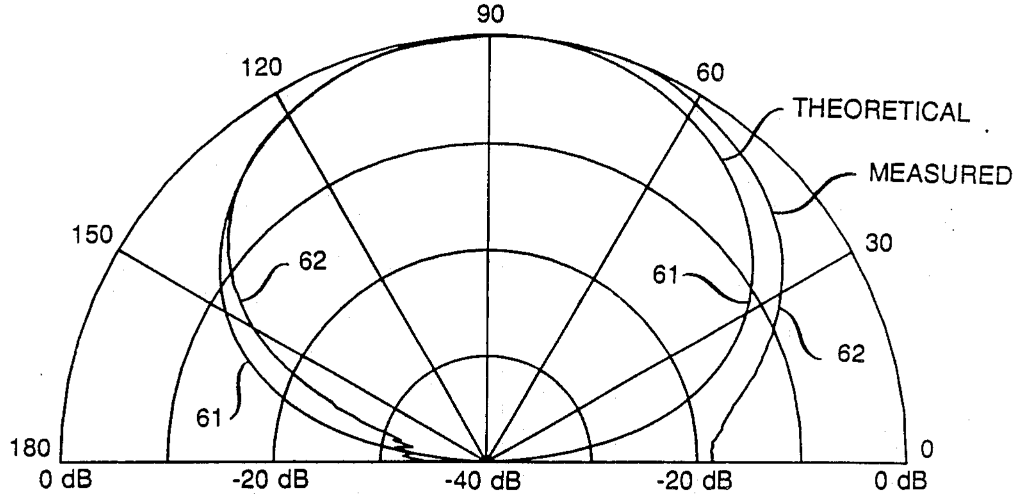
FIG. 6 shows the measured $\theta$ directivity for the wall-mounted toroidal array, $\phi=90°$, array aligned along x-axis.
Figure 7:
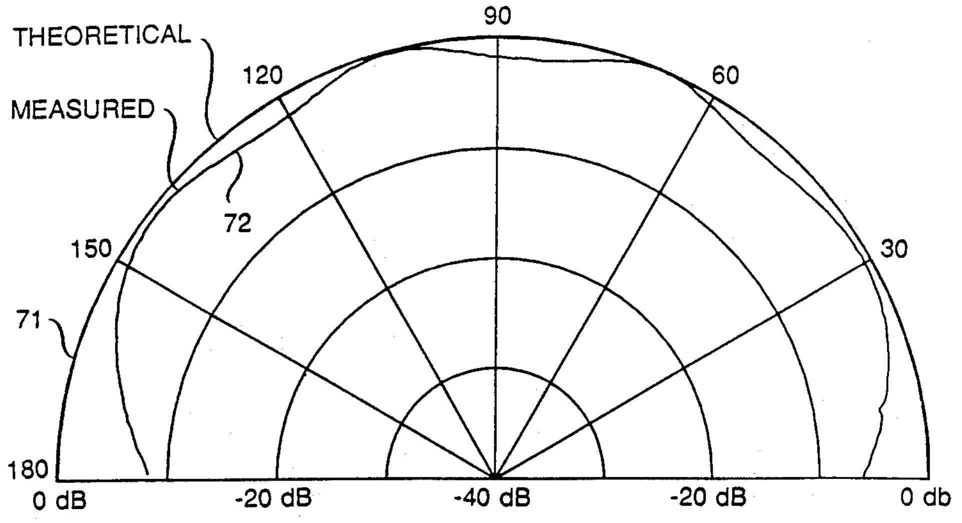
FIG. 7 is the measured $\phi$ directivity for the wall-mounted toroidal array, $\phi=0°$, array aligned along x-axis.
Figure 8:
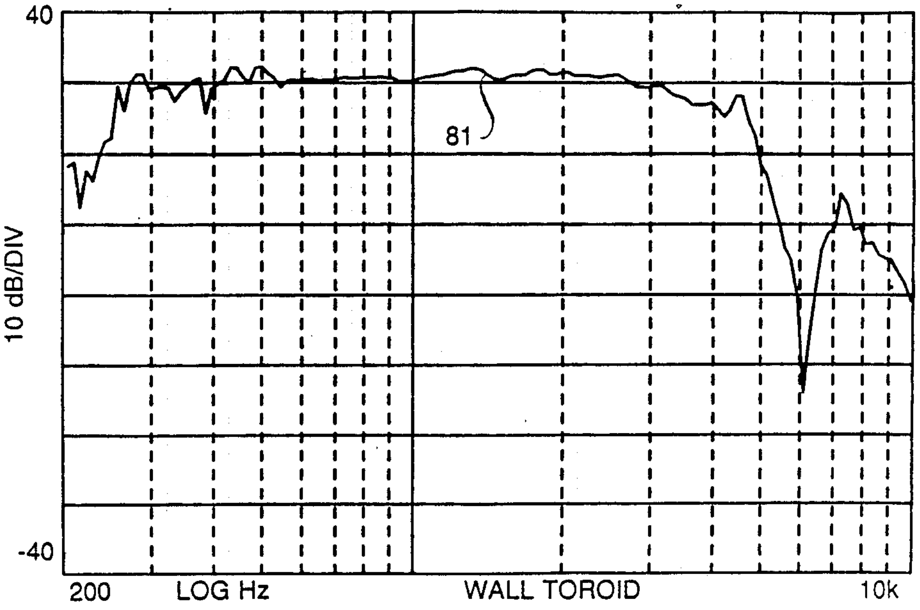
FIG. 8 is the measured corrected frequency response for the wall-mounted toroid (corrected by $\omega^2$).
Figure 9:
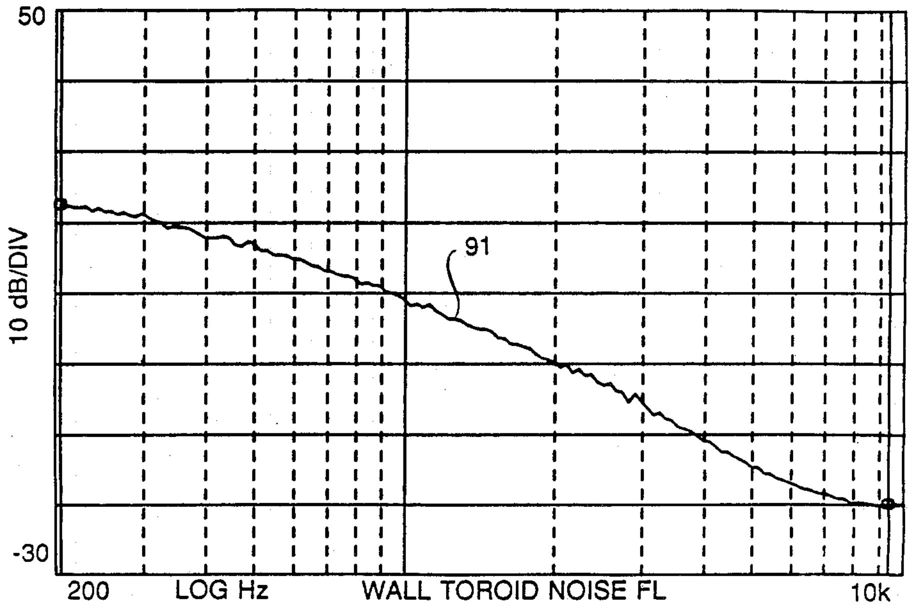
FIG. 9 is the measured corrected noise floor for the wall-mounted array.

It can be seen from the analysis that the combination of the FOG and its image in the manner prescribed here, form a second-order unidirectional microphone. Experimental results obtained for various $z_o$ show the system to closely correspond to the expected theoretical results. FIG. 6 and FIG. 7 show the results for $z_o = 2.5$ cm for both the $\theta$ and $\phi$ planes. The beam width is approximately $\pm 35°$. The accuracy of this system is due to the perfect match between the FOG and its image. The frequency response of this system has the expected $\omega^2$ dependency. A corrected frequency response is shown in FIG. 8. The A-weighted noise floor for the corrected toroidal sensor is shown in FIG. 9. The A-weighted equivalent sound pressure level of the sensor noise is 36 dB above 200 Hz.

It can readily be appreciated, by those skilled in the art, that other arrays and arrangements of microphones and sensors can be made by following the above-described principles of our invention.

For example, the line array of FIG. 11 can be replaced by a square array to narrow the pick-up pattern in the horizontal plane.

We claim:

1. An acoustic sensor arrangement, which comprises:

a directional acoustic sensor unit having first-order gradient characteristics an acoustically reflecting surface said sensor unit being positioned relative to said reflecting surface whereby the acoustic interaction between said sensor unit and said surface causes the output of said sensor unit to have a second-order gradient response pattern.

2. An acoustic sensor arrangement according to claim 1 in which selected portions of the acoustically reflecting surface incorporate acoustic absorbing material.

3. An acoustic sensor arrangement according to claim 1 in which the acoustically reflecting surface has a lateral extent for which the linear dimensions are much greater than the spacing of said reflecting surface from said sensor unit.

4. An acoustic sensor arrangement according to claim 1 in which the acoustically reflecting surface is acoustically essentially planar for acoustic waves having a selected range of wavelengths.

5. An acoustic sensor arrangement according to claim 4 in which the acoustically reflecting arrangement is a major surface of or within an enclosure sized to enclose a source of said acoustic waves.

6. An acoustic sensor arrangement according to claim 1 in which the sensor unit has a directivity pattern having a major axis and a minor axis the acoustically reflecting surface is oriented with respect to said axes to accentuate directivity of said directivity pattern to increase sensitivity of said unit to acoustic waves propagating parallel to said major axis as compared to sensitivity to acoustic waves propagating parallel to said minor axis.

7. An acoustic sensor arrangement according to claim 6 in which the acoustically reflecting surface is oriented essentially orthogonal to the major axis of the directivity pattern of the sensor unit.

8. An acoustic sensor arrangement according to claim 7 in which the acoustically reflecting surface has two orthogonal linear dimensions much greater than the longest wavelength of a selected wavelength range of said acoustic waves.

9. An acoustic sensor arrangement according to claim 8 in which said acoustically-reflecting surface is acoustically essentially planar throughout the range of said two orthogonal linear dimensions for all acoustic waves in said selected wavelength range.

10. An acoustic sensor arrangement according to claim 9 in which the acoustically-reflecting surface, is a major surface of or within a room.

11. An acoustic sensor arrangement according to claim 7 in which the sensor unit has a directivity pattern in the absence of the acoustically reflecting surface, which pattern varies at least in part according to cos $\theta$, where $\theta$ is the angle between the direction of propagation of an acoustic wave to be sensed and said major axis of said pattern, whereby the acoustically reflecting surface modifies the directivity pattern to vary in said same part according to $\cos^2\theta$.

12. An acoustic sensor arrangement according to claim 1 in which the acoustic sensor unit includes a sensitive portion and an associated acoustical baffle, said sensitive portion being centrally disposed within said baffle to create said directivity pattern having a major axis, said acoustically-reflecting surface having a planar surface having a separation from said sensor unit less than one-quarter of a selected wavelength of an acoustic wave to be sensed and having planar dimensions at least an order of magnitude greater than said separation.

13. An acoustic sensor arrangement according to claim 1 or claim 12 including at least two of said acoustic sensor units to form an array.

14. An acoustic sensor arrangement according to claims 1, 3, 4, 5, 6, 7, 8, 9, 10, 11 or 12 including a plurality of said acoustic sensor units, each having the major axis of its directivity pattern essentially orthogonal to said major surface of the acoustically-reflecting surface, whereby the sensor arrangement has an essentially undirectional directivity pattern.

15. An acoustic sensor arrangement according to claims 1, 3, 4, 5, 6, 7, 8, 9, 10, 11, or 12 including a plurality of said acoustic sensor units, each having the major axis of its directivity pattern inclined toward a common region of said acoustically-reflecting surface whereby the sensor arrangement has an essentially toroidal directivity pattern.

16. An acoustic sensor arrangement according to claims 1, 3, 4, 5, 6, 7, 8, 9, 10, 11 or 12 including a plurality of said acoustic sensor units, each having the major axis of its directivity pattern inclined toward a region of said acoustically-reflecting surface said region being substantially central with respect said plurality of units, and further including an omnidirectional acoustic sensor disposed at said substantially central region to modify the directivity pattern of the arrangement to increase sensitivity to acousticwaves propagating over said major surface of said image effecting means at angles greater than 45° from the normal to said surface.

17. An acoustic sensor arrangement according to claim 1 or claim 12 including a sufficient number of the acoustic sensor units in an array to define a reception beam of selected shape.

18. An acoustic sensor arrangement according to claim 1 or claim 12 including an acoustically reflecting wall as at least a part of the acoustically reflecting surface and a substantial number of the acoustic sensor units in an array with respect to said wall to define a reception beam having a selected variation of reception sensitivity in the vertical dimension.

19. An acoustic sensor arrangement according to claim 1 or claim 12 including an acoustically reflecting table surface as at least a part of the acoustically reflecting surface effecting means and a plurality of unidirectional acoustic units in a reception-pattern forming array with respect to said acoustically reflecting table surface.

* * * * *

Disclaimer and Dedication 4,965,775—Gary W. Elko, Summit, Robert A. Kubli, Whitehouse, both of N.J.; Jeffrey P. McAteer, Fishers, Ind.; James E. West, Plainfield, N.J. IMAGE DERIVED DIRECTIONAL MICROPHONES. Patent dated Oct. 23, 1990. Disclaimer and Dedication filed July 17, 1997, by the assignee, Lucent Technologies, Inc.

Hereby disclaims and dedicates to the public claims 1, 2, 3, 4, 6, 7, 8, 9, 10, and 11 of said patent.

*(Official Gazette,* August 26, 1997)